US012620314B2

(12) United States Patent
Kashihara et al.

(10) Patent No.: US 12,620,314 B2
(45) Date of Patent: May 5, 2026

(54) WRONG-WAY DRIVING DETERMINATION APPARATUS AND WRONG-WAY DRIVING DETERMINATION METHOD

(71) Applicant: Mitsubishi Electric Corporation, Tokyo (JP)

(72) Inventors: Takumi Kashihara, Tokyo (JP); Kosei Uchino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 257 days.

(21) Appl. No.: 18/029,464

(22) PCT Filed: Dec. 10, 2020

(86) PCT No.: PCT/JP2020/045976

§ 371 (c)(1),
(2) Date: Mar. 30, 2023

(87) PCT Pub. No.: WO2022/123712

PCT Pub. Date: Jun. 16, 2022

(65) Prior Publication Data

US 2023/0360533 A1 Nov. 9, 2023

(51) Int. Cl.
*G08G 1/16* (2006.01)
*G08G 1/01* (2006.01)

(52) U.S. Cl.
CPC ........... *G08G 1/166* (2013.01); *G08G 1/0112* (2013.01); *G08G 1/0133* (2013.01)

(58) Field of Classification Search
CPC ..... G08G 1/166; G08G 1/0112; G08G 1/0133
See application file for complete search history.

(56) References Cited

U.S. PATENT DOCUMENTS 10,992,755 B1 * 4/2021 Tran ...................... B60W 40/09
2011/0121992 A1 5/2011 Konaka et al.
(Continued)

FOREIGN PATENT DOCUMENTS

CN 106663376 A 5/2017
JP 2008-3801 A 1/2008
(Continued)

OTHER PUBLICATIONS

Japanese Notice of Reasons for Refusal for Japanese Application No. 2022-567961, dated Jul. 18, 2023, with English translation.
(Continued)

*Primary Examiner* — Peter D Nolan
*Assistant Examiner* — Wae L Louie
(74) *Attorney, Agent, or Firm* — Birch, Stewart, Kolasch & Birch, LLP

(57) ABSTRACT

In a wrong-way driving determination apparatus, a road information generation unit generates, based on surroundings information acquired by a surroundings monitoring sensor of a subject vehicle, road information including information on a location and a proper direction of travel of each lane of a road on which the subject vehicle is traveling. A travel state information calculation unit calculates, based on the surroundings information, travel state information including information on a location and a direction of travel of the subject vehicle on the road on which the subject vehicle is traveling. A wrong-way driving determination unit calculates a wrong-way driving possibility of the subject vehicle based on the road information and the travel state information, and determines whether the subject vehicle is traveling the wrong way based on a value of the wrong-way driving possibility.

13 Claims, 11 Drawing Sheets

(56) References Cited

U.S. PATENT DOCUMENTS

| | | | | |
|---|---|---|---|---|
| 2012/0179742 | A1* | 7/2012 | Acharya | H04N 21/23116 709/202 |
| 2013/0162448 | A1* | 6/2013 | Mochizuki | G08G 1/056 340/905 |
| 2013/0338914 | A1* | 12/2013 | Weiss | G08G 1/0129 340/905 |
| 2015/0145699 | A1* | 5/2015 | Mielenz | G01N 5/02 340/935 |
| 2017/0261315 | A1 | 9/2017 | Yamaguchi et al. | |
| 2018/0281782 | A1* | 10/2018 | Salter | B60Q 1/525 |
| 2019/0101924 | A1* | 4/2019 | Styler | G06V 20/56 |
| 2020/0172091 | A1* | 6/2020 | Takasaki | G08G 1/0145 |
| 2021/0183239 | A1* | 6/2021 | Adireddy | G08G 1/0125 |
| 2022/0172611 | A1* | 6/2022 | Turato | H04B 10/073 |
| 2022/0274593 | A1* | 9/2022 | McFarland, Jr. | G08G 1/0112 |

FOREIGN PATENT DOCUMENTS

| | | | |
|---|---|---|---|
| JP | 2009-250964 | A | 10/2009 |
| JP | 2012-64121 | A | 3/2012 |
| JP | 2019-194756 | A | 11/2019 |
| JP | 2019-207454 | A | 12/2019 |
| WO | WO 2012/036050 | A1 | 3/2012 |

OTHER PUBLICATIONS

International Search Report (PCT/ISA/210) issued in PCT/JP2020/045976, dated Feb. 22, 2021.

Chinese Office Action and Search Report for Chinese Application No. 202080107612.4, dated Sep. 13, 2024, with English translation.

Chinese Office Action for Chinese Application No. 202080107612.4, dated Mar. 21, 2025, with English translation.

Chinese Office Action for Chinese Application No. 202080107612.4, dated Jul. 22, 2025, with English translation.

* cited by examiner

WRONG-WAY DRIVING DETERMINATION APPARATUS AND WRONG-WAY DRIVING DETERMINATION METHOD

TECHNICAL FIELD

The present disclosure relates to a wrong-way driving determination apparatus that determines whether a vehicle is traveling the wrong way.

BACKGROUND ART

With the aging of society, so-called wrong-way driving of a vehicle, which is a driver's act of driving the vehicle against a direction of travel (hereinafter referred to as a "proper direction of travel") of a road or a lane prescribed by the traffic laws, has become a social problem, and various techniques of detecting wrong-way driving of the vehicle have been proposed. For example, Patent Document 1 below proposes a wrong-way driving determination system of determining that there is a high possibility of wrong-way driving of a vehicle when a change in direction of the vehicle with a turning radius equal to or smaller than half the width of a road on which the vehicle is traveling is detected. Furthermore, Patent Document 2 below proposes a driving assistance apparatus of determining that a vehicle is traveling the wrong way, and informing a driver accordingly when a direction of travel of the vehicle opposite a proper direction of travel of a lane in which the vehicle is traveling is detected.

PRIOR ART DOCUMENTS

Patent Documents

Patent Document 1: Japanese Patent Application Laid-Open No. 2019-194756

Patent Document 2: Japanese Patent Application Laid-Open No. 2008-003801

SUMMARY

Problem to be Solved by the Invention

In techniques disclosed in Patent Documents 1 and 2, information on the width of the road on which the vehicle is traveling, information on the proper direction of travel of the lane in which the vehicle is traveling, and the like used to determine whether the vehicle is traveling the wrong way are acquired by checking a location of the vehicle measured by satellite positioning using the Global Positioning System (GPS) and the like against map information. Accuracy of determination on whether the vehicle is traveling the wrong way thus depends heavily on accuracy of satellite positioning, and might be reduced in urban areas where accuracy of satellite positioning is likely to be reduced due to multipath errors, for example.

The present disclosure has been conceived to solve a problem as described above, and it is an object of the present disclosure to provide a wrong-way driving determination apparatus capable of determining whether a vehicle is traveling the wrong way with stability and high accuracy.

Means to Solve the Problem

A wrong-way driving determination apparatus according to the present disclosure includes: a road information generation unit that generates, based on surroundings information acquired by a surroundings monitoring sensor of a subject vehicle, road information including information on a location and a proper direction of travel of each lane of a road on which the subject vehicle is traveling; a travel state information calculation unit that calculates, based on the surroundings information, travel state information including information on a location and a direction of travel of the subject vehicle on the road on which the subject vehicle is traveling; and a wrong-way driving determination unit that calculates a wrong-way driving possibility of the subject vehicle based on the road information and the travel state information, and determines whether the subject vehicle is traveling the wrong way based on a value of the wrong-way driving possibility.

Effects of the Invention

According to the present disclosure, accuracy of calculation of the wrong-way driving possibility of the subject vehicle does not depend on accuracy of satellite positioning and accuracy of map information, so that whether the subject vehicle is traveling the wrong way can be determined with stability and high accuracy.

The objects, features, aspects and advantages of the present disclosure will become more apparent from the following detailed description and the accompanying drawings.

DESCRIPTION OF EMBODIMENTS

Embodiment 1

Figure 1:
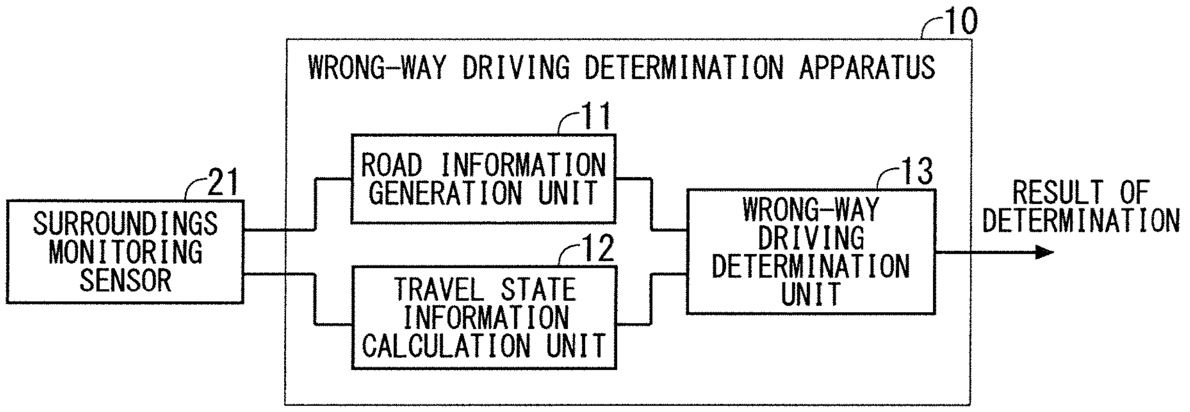
FIG. 1 is a diagram showing a configuration of a wrong-way driving determination apparatus according to Embodiment 1.

FIG. 1 is a diagram showing a configuration of a wrong-way driving determination apparatus 10 according to Embodiment 1. Assume that the wrong-way driving determination apparatus 10 is mounted on a vehicle, and the vehicle on which the wrong-way driving determination apparatus 10 has been mounted is hereinafter referred to as a "subject vehicle" in Embodiment 1. The wrong-way driving determination apparatus 10, however, is not required to be permanently installed on the subject vehicle, and may be implemented on a portable apparatus, such as a mobile phone, a smartphone, and a portable navigation device (PND), capable of being brought into a vehicle. The wrong-way driving determination apparatus 10 may partially be implemented on a server installed outside the subject vehicle and capable of communicating with the wrong-way driving determination apparatus 10.

As shown in FIG. 1, the wrong-way driving determination apparatus 10 is connected to a surroundings monitoring sensor 21 mounted on the subject vehicle. The surroundings monitoring sensor 21 is a sensor that detects a location and a shape of a feature around the subject vehicle, for example, and is configured by a camera, a laser irradiator referred to as a light detection and ranging (LiDAR), or a combination thereof, for example. The location of the feature detected by the surroundings monitoring sensor 21 is a location relative to the subject vehicle, and includes information on a distance and a direction from the subject vehicle. The feature detected by the surroundings monitoring sensor 21 includes not only a stereoscopic feature, such as a non-subject vehicle and an obstacle (e.g., a guardrail, a curb, and a side ditch), but also a planar feature, such as a road surface marking (e.g., a lane marking and a travel direction marking) painted on a road surface and a road shoulder.

As shown in FIG. 1, the wrong-way driving determination apparatus 10 includes a road information generation unit 11, a travel state information calculation unit 12, and a wrong-way driving determination unit 13.

The road information generation unit 11 generates road information being information on a road on which the subject vehicle is traveling based on surroundings information being information acquired by the surroundings monitoring sensor 21 of the subject vehicle. The road information at least includes information on a location and a proper direction of travel of each lane of the road on which the subject vehicle is traveling.

Figure 2:
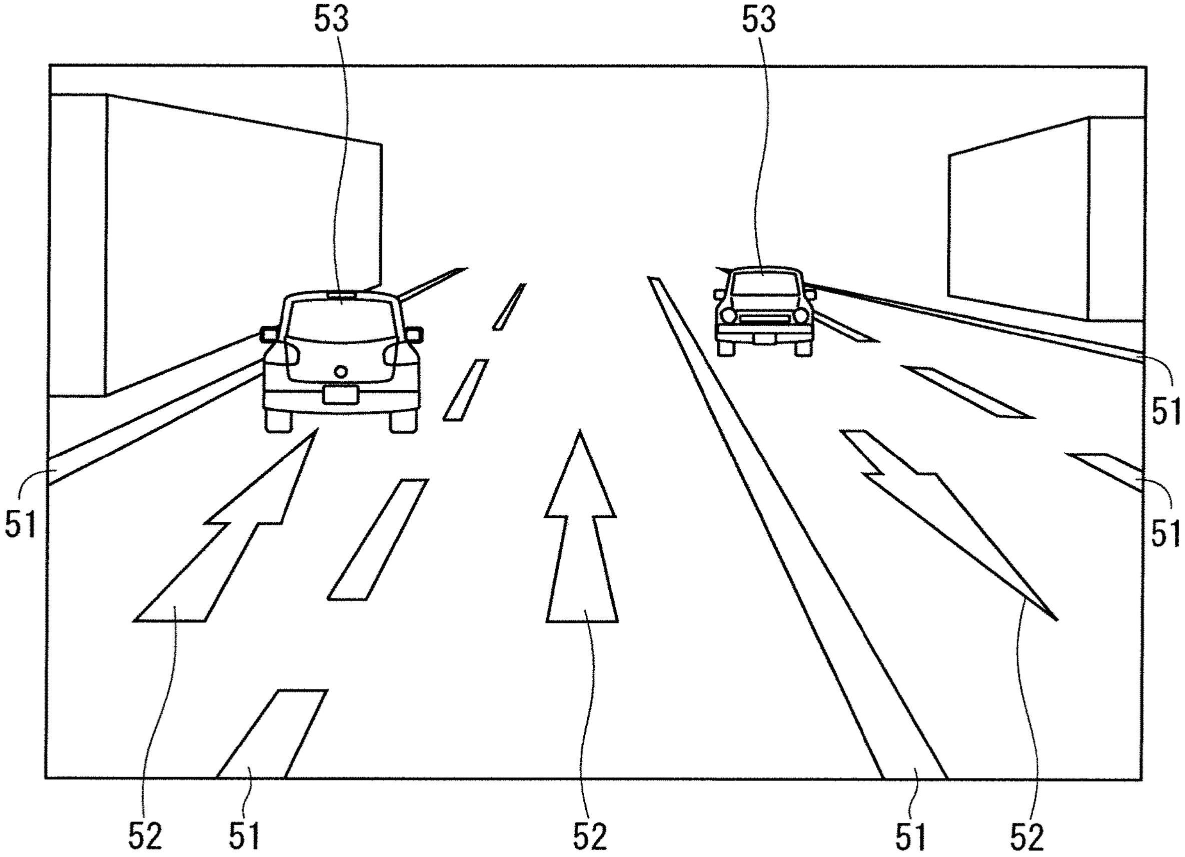
FIG. 2 is a diagram for describing information recognized by a surroundings monitoring sensor.
Figure 3:
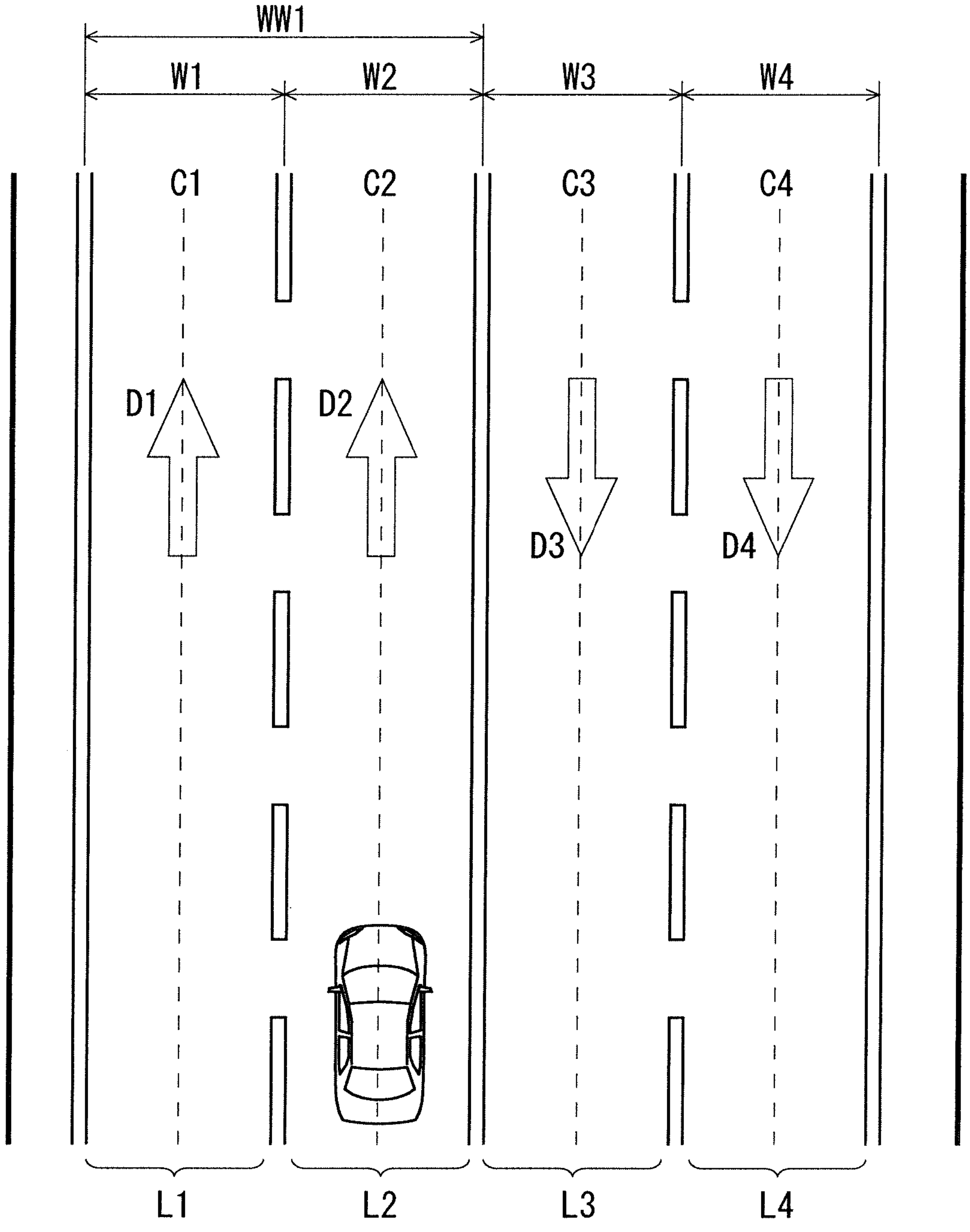
FIG. 3 is a diagram for describing road information generated by a road information generation unit.

A scheme of generating the road information is herein described assuming that a camera as the surroundings monitoring sensor 21 captures an image forward of the subject vehicle as shown in FIG. 2, and the road information generation unit 11 generates the road information as shown in FIG. 3. For example, information on lanes (L1 to L4 in FIG. 3) of the road information can be generated by extracting regions between two parallel lane markings 51. Information on proper directions of travel (D1 to D4 in FIG. 3) of the respective lanes can be generated based on travel direction markings 52 (road surface markings indicated by arrows) painted on road surfaces of the lanes and directions of travel of non-subject vehicles 53 traveling in the lanes.

When it is clearly recognizable that the subject vehicle is traveling on a two-way road from a type of a lane marking 51 as a median line of the road (e.g., a lane marking representing no straddling for passing) or the presence of a median strip, the road information generation unit 11 may determine the proper directions of travel of the lanes using a result of recognition. That is to say, the road information generation unit 11 may determine the proper directions of travel of the lanes by whether a location of each of the lanes is to the left or to the right of the median line or the median strip.

The road information may further include information on the width of a road, the number of lanes, the width of each lane, a location of a centerline of each lane, and the like. For example, widths (W1 to W4 in FIG. 3) of the lanes can each be defined as a minimum distance between two lane markings 51 sandwiching the lane. Centerlines (C1 to C4 in FIG. 3) of the lanes can each be defined as a set of points at equal distances from two lane markings 51 sandwiching the lane. The number of lanes can be defined as the number of centerlines of the detected lanes. In the present embodiment, the width (WW1 in FIG. 3) of the road on which the subject vehicle is traveling is defined as the sum of widths (W1+W2 in FIG. 3) of lanes having the same proper direction of travel. That is to say, the width (WW1 in FIG. 3) of the road on which the subject vehicle is traveling does not include widths (W3 and W4 in FIG. 3) of oncoming lanes.

The road information generation unit 11 repeats generation of the road information with a regular period (e.g., 30 fps), and updates previously generated road information with newly generated road information or adds the newly generated road information to the previously generated road information. When a certain time (e.g., five seconds) has elapsed since update or addition of the road information, the road information is erased from the old one.

The travel state information calculation unit 12 calculates travel state information being information on a travel state of the subject vehicle based on the surroundings information acquired from the surroundings monitoring sensor 21. The travel state information at least includes information on a location and a direction of travel of the subject vehicle on the road on which the subject vehicle is traveling. For example, the travel state information calculation unit 12 calculates a current location and a current direction of travel of the subject vehicle by acquiring a location and a direction of travel when the subject vehicle is stopped as an initial location and an initial direction of travel of the subject vehicle, calculating the amount of change in location and the amount of change in direction of travel of the subject vehicle with a regular period during travel of the subject vehicle based on a change in locations of features extracted from the surroundings information, and accumulating them with respect to the initial location and the initial direction of travel of the subject vehicle.

The wrong-way driving determination unit 13 calculates a wrong-way driving possibility P1 of the subject vehicle based on the road information generated by the road information generation unit 11 and the travel state information of the subject vehicle calculated by the travel state information calculation unit 12. Furthermore, the wrong-way driving determination unit 13 determines whether the subject vehicle is traveling the wrong way based on a value of the calculated wrong-way driving possibility P1, and outputs a result of determination. "Wrong-way driving" of a vehicle refers to travel of the vehicle against a proper direction of travel of a road or a lane. In description made below, travel of the vehicle along the proper direction of travel is also referred to as "forward driving".

The wrong-way driving determination unit 13 determines a lane in which the subject vehicle is traveling from the location of each lane included in the road information and the location of the subject vehicle included in the travel state information to map the location of the subject vehicle represented by the travel state information onto the lane represented by the road information. As described above, while the road information is only required to at least include the information on the location and the proper direction of travel of each lane of the road on which the subject vehicle is traveling, the road information may further include information on the width and the location of the centerline of each lane and the like. In this case, accuracy of determination (i.e., accuracy of mapping) of the lane in which the subject vehicle is traveling can be improved by the wrong-way driving determination unit 13 determining the lane in which the subject vehicle is traveling while taking the information on the width and the location of the centerline of each lane and the like into consideration.

The wrong-way driving determination unit 13 calculates a difference (hereinafter referred to as an "orientation difference Y") between the proper direction of travel of the lane included in the road information and the direction of travel of the subject vehicle included in the travel state information, and calculates the wrong-way driving possibility P1 based on the orientation difference Y.

In the present embodiment, the wrong-way driving determination unit 13 calculates the wrong-way driving possibility P1 as zero when the orientation difference Y is less than 90°. The wrong-way driving determination unit 13 calculates the wrong-way driving possibility P1 as 0.5 when the orientation difference Y is 90°, that is, when the direction of travel of the subject vehicle is orthogonal to the proper direction of travel. When the orientation difference Y is more than 90°, the wrong-way driving possibility P1 is increased with increasing orientation difference Y so that the wrong-way driving possibility P1 is calculated as 1.0 when the orientation difference Y is 180°, that is, when the direction of travel during travel of the subject vehicle and the proper direction of travel oppose each other. As long as a condition that the wrong-way driving possibility P1 is calculated as 1.0 when the orientation difference Y is 180° is met, a ratio of an increase in wrong-way driving possibility P1 to an increase in orientation difference Y when the orientation difference Y is more than 90° may be either a fixed value or a value varying depending on the orientation difference Y.

A method of calculating the wrong-way driving possibility P1 is not limited to this method, and the wrong-way driving determination unit 13 may calculate the wrong-way driving possibility P1 based on the inner product of a vector in the proper direction of travel of the lane in which the subject vehicle is traveling and a vector in the direction of travel of the subject vehicle, for example.

The wrong-way driving determination unit 13 determines that the subject vehicle is traveling the wrong way when the value of the calculated wrong-way driving possibility P1 exceeds a predetermined threshold (e.g., 0.7). A result of determination on whether the subject vehicle is traveling the wrong way is output from the wrong-way driving determination apparatus 10, and is used by a warning apparatus that warns a driver when it is determined that the subject vehicle is traveling the wrong way and a driving assistance apparatus that stops the subject vehicle in a safe place when it is determined that the subject vehicle is traveling the wrong way, for example.

Since the wrong-way driving possibility P1 is calculated based on the orientation difference Y being the difference between the proper direction of travel of the lane in which the subject vehicle is traveling and the direction of travel of the subject vehicle, reliability of the proper direction of travel of the lane in which the subject vehicle is traveling can be considered as reliability N1 of the wrong-way driving possibility P1. In the present embodiment, the road information generation unit 11 can consider the sum of the number of travel direction markings whose directions can be recognized and the number of non-subject vehicles whose directions can be recognized in the lane in which the subject vehicle is traveling as the reliability of the proper direction of travel of the lane in which the subject vehicle is traveling, that is, the reliability N1 of the wrong-way driving possibility P1.

As described above, according to the wrong-way driving determination apparatus 10 according to Embodiment 1, the wrong-way driving possibility P1 of the subject vehicle is calculated without using satellite positioning and map information. Whether the subject vehicle is traveling the wrong way can thus be determined with stability and high accuracy with accuracy of calculation of the wrong-way driving possibility P1 not depending on accuracy of satellite positioning and accuracy of the map information.

Figure 4:
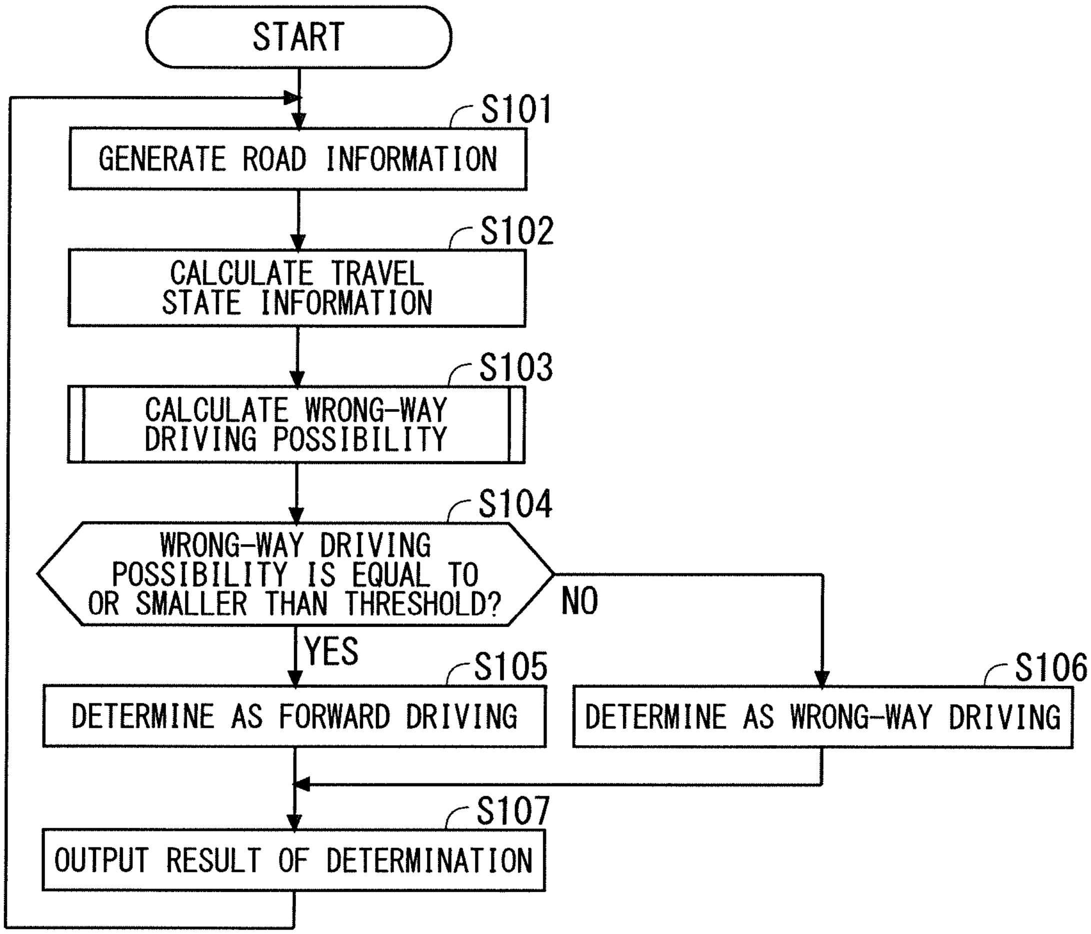
FIG. 4 is a flowchart showing operation of the wrong-way driving determination apparatus according to Embodiment 1.

FIG. 4 is a flowchart showing operation of the wrong-way driving determination apparatus 10 according to Embodiment 1. Operation of the wrong-way driving determination apparatus 10 will be described below with reference to FIG. 4.

When the wrong-way driving determination apparatus 10 starts operation, the road information generation unit 11 first generates the road information being the information on the road on which the subject vehicle is traveling based on the surroundings information acquired from the surroundings monitoring sensor 21 of the subject vehicle (step S101). The road information at least includes the information on the location and the proper direction of travel of each lane of the road on which the subject vehicle is traveling.

Next, the travel state information calculation unit 12 calculates the travel state information being the information on the travel state of the subject vehicle based on the surroundings information (step S102). The travel state information at least includes the information on the location and the direction of travel of the subject vehicle on the road on which the subject vehicle is traveling.

Then, the wrong-way driving determination unit 13 calculates the wrong-way driving possibility P1 of the subject vehicle based on the road information generated by the road information generation unit 11 and the travel state information of the subject vehicle calculated by the travel state information calculation unit 12 (step S103).

Figure 5:
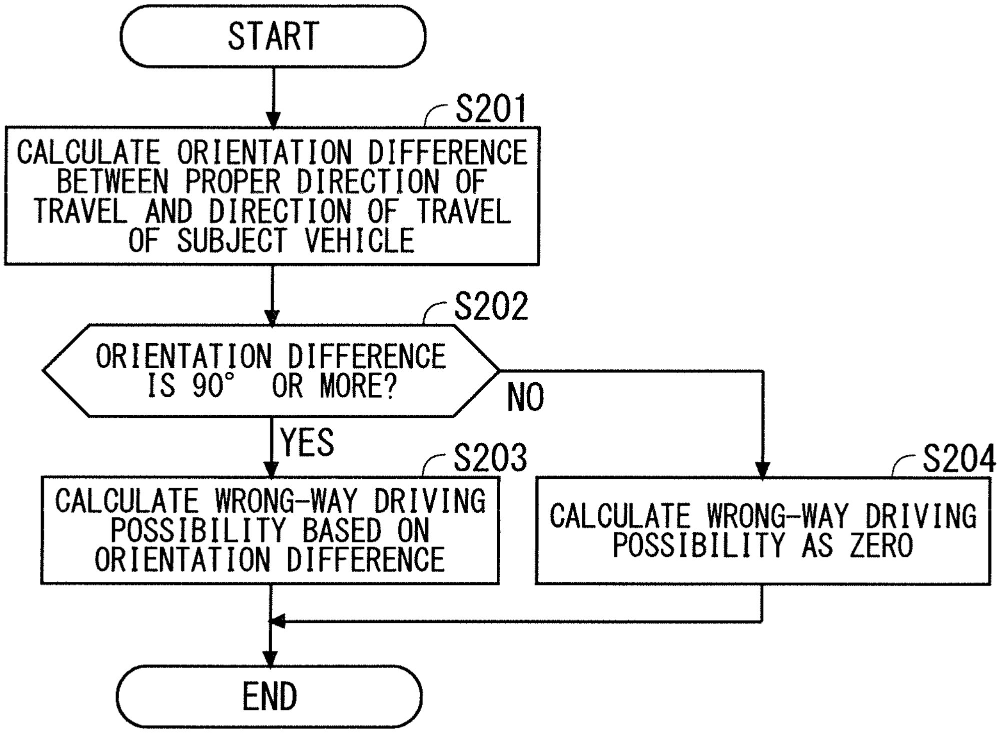
FIG. 5 is a flowchart showing processing of calculating a wrong-way driving possibility in Embodiment 1.

In step S103, the wrong-way driving determination unit 13 performs processing shown in FIG. 5. That is to say, the wrong-way driving determination unit 13 determines the lane in which the subject vehicle is traveling from the location of each lane included in the road information and the location of the subject vehicle included in the travel state information, and calculates the orientation difference Y between the proper direction of travel of the lane and the direction of travel of the subject vehicle (step S201). In this case, when the orientation difference Y is 90° or more (YES in step S202), the wrong-way driving determination unit 13 calculates the wrong-way driving possibility P1 based on the orientation difference Y (step S203). On the other hand, when the orientation difference Y is less than 90° (NO in step S202), the wrong-way driving determination unit 13 calculates the wrong-way driving possibility P1 as zero (step S204).

Referring back to FIG. 4, the wrong-way driving determination unit 13 checks whether the value of the wrong-way driving possibility P1 calculated in step S103 is equal to or smaller than the predetermined threshold (e.g., 0.7) (step S104). When the value of the wrong-way driving possibility P1 is equal to or smaller than the threshold (YES in step S104), the wrong-way driving determination unit 13 determines that the subject vehicle is traveling in a forward direction (step S105). When the value of the wrong-way driving possibility P1 is greater than the threshold (NO in step S104), the wrong-way driving determination unit 13 determines that the subject vehicle is traveling the wrong way (step S106).

A result of determination made by the wrong-way driving determination unit 13 is externally output (step S107), and then processing returns to step S101. The wrong-way driving determination apparatus 10 repeatedly performs the above-mentioned operation.

[Modification 1]

Figure 6:
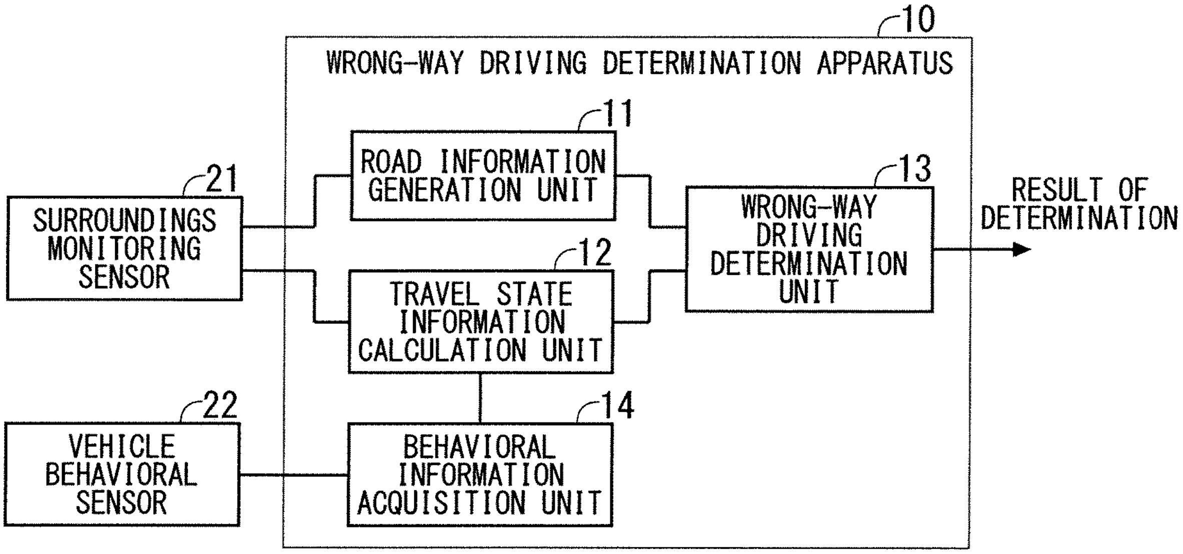
FIG. 6 is a diagram showing a configuration of a wrong-way driving determination apparatus according to a modification of Embodiment 1.

FIG. 6 is a diagram showing a modification of the wrong-way driving determination apparatus 10 according to Embodiment 1. A configuration shown in FIG. 6 is a configuration obtained by connecting a vehicle behavioral sensor 22 outside the wrong-way driving determination apparatus 10, and providing a behavioral information acquisition unit 14 in the wrong-way driving determination apparatus 10 with respect to the configuration shown in FIG. 1.

The vehicle behavioral sensor 22 is a sensor to detect behavior of the subject vehicle, and is a speed sensor, an acceleration sensor, and an orientation sensor, for example. The behavioral information acquisition unit 14 acquires behavioral information being information on the behavior of the subject vehicle acquired by the vehicle behavioral sensor 22.

In the present modification, when the amount of change in location and the amount of change in direction of travel of the subject vehicle cannot be calculated from the surroundings information acquired by the surroundings monitoring sensor 21 (when the current location and the current direction of travel of the subject vehicle cannot be calculated from the surroundings information), the travel state information calculation unit 12 calculates the current location and the current direction of travel of the subject vehicle by calculating the amount of change in location and the amount of change in direction of travel of the subject vehicle from the behavioral information acquired by the behavioral information acquisition unit 14.

Even when the amount of change in location and the amount of change in direction of travel of the subject vehicle can be calculated from the surroundings information acquired by the surroundings monitoring sensor 21, the wrong-way driving determination unit 13 may use the behavioral information acquired by the behavioral information acquisition unit 14 to correct these pieces of information.

According to the present modification, even when the amount of change in location and the amount of change in direction of travel of the subject vehicle cannot be calculated from the surroundings information acquired by the surroundings monitoring sensor 21, the travel state information calculation unit 12 can calculate the current location and the current direction of travel of the subject vehicle, so that the wrong-way driving determination unit 13 can continuously calculate the wrong-way driving possibility of the subject vehicle.

Embodiment 2

Embodiment 2 shows an example in which the wrong-way driving determination unit 13 calculates a wrong-way driving possibility P2 of the vehicle by another method not using satellite positioning and the map information. A configuration and basic operation of the wrong-way driving determination apparatus 10 according to Embodiment 2 are the same as those shown in FIGS. 1 and 4, so that only a method by which the wrong-way driving determination unit 13 calculates the wrong-way driving possibility P2 will be described herein.

For example, when the subject vehicle turns from a lane closest to an oncoming lane to a side of the oncoming lane to reverse the direction of travel, the turn is considered as a normal U-turn to the oncoming lane. However, when the subject vehicle turns from a lane that is not the lane closest to the oncoming lane to reverse the direction of travel or when the subject vehicle turns to a side opposite the oncoming lane to reverse the direction of travel, it is considered that there is a high possibility of wrong-way driving of the subject vehicle.

The wrong-way driving determination unit 13 according to Embodiment 2 thus calculates the wrong-way driving possibility P2 based on a lane in which the subject vehicle was traveling before turning, a turning direction and a turning radius of the subject vehicle, and the amount of change in direction of travel from the start of turning of the subject vehicle (hereinafter simply referred to as the "amount of change in direction of travel"). The turning direction and the turning radius of the subject vehicle can be calculated based on the location and the direction of travel of the subject vehicle included in the travel state information calculated by the travel state information calculation unit 12.

Specifically, when the subject vehicle turns to the side opposite the oncoming lane or when the subject vehicle turns from the lane that is not the lane closest to the oncoming lane, and when the turning radius of the subject vehicle is equal to or smaller than a predetermined threshold, the wrong-way driving determination unit 13 determines that there is a possibility of wrong-way driving of the subject vehicle, and calculates the wrong-way driving possibility P2 in accordance with the amount of change in direction of travel of the subject vehicle.

In the present embodiment, the threshold for the turning radius is set to half the width of the road on which the subject vehicle is traveling. A method of setting the threshold, however, may be any method, and half the distance between a lane farthest from the subject vehicle from among lanes which are located on a side of the turning direction of the subject vehicle and whose proper directions of travel are the same as that of the lane in which the subject vehicle is traveling and the lane in which the subject vehicle is traveling may be set to the threshold for the turning radius.

The wrong-way driving possibility P2 is defined as a ratio of the amount of change in direction of travel of the subject vehicle to a certain angle $\theta$ (e.g., a fixed value from 120° to 180°). For example, assuming that the certain angle $\theta$ is 180°, the wrong-way driving possibility P2 is 0.5 when the amount of change in direction of travel of the subject vehicle is 90°. Alternatively, the wrong-way driving possibility P2 may be defined as a ratio of a travel distance from the start of turning of the subject vehicle to a travel distance ($2\pi R\cdot\theta/360$) necessary for the subject vehicle to turn the certain angle $\theta$ calculated from the turning radius R at the start of turning of the subject vehicle.

Figure 7:
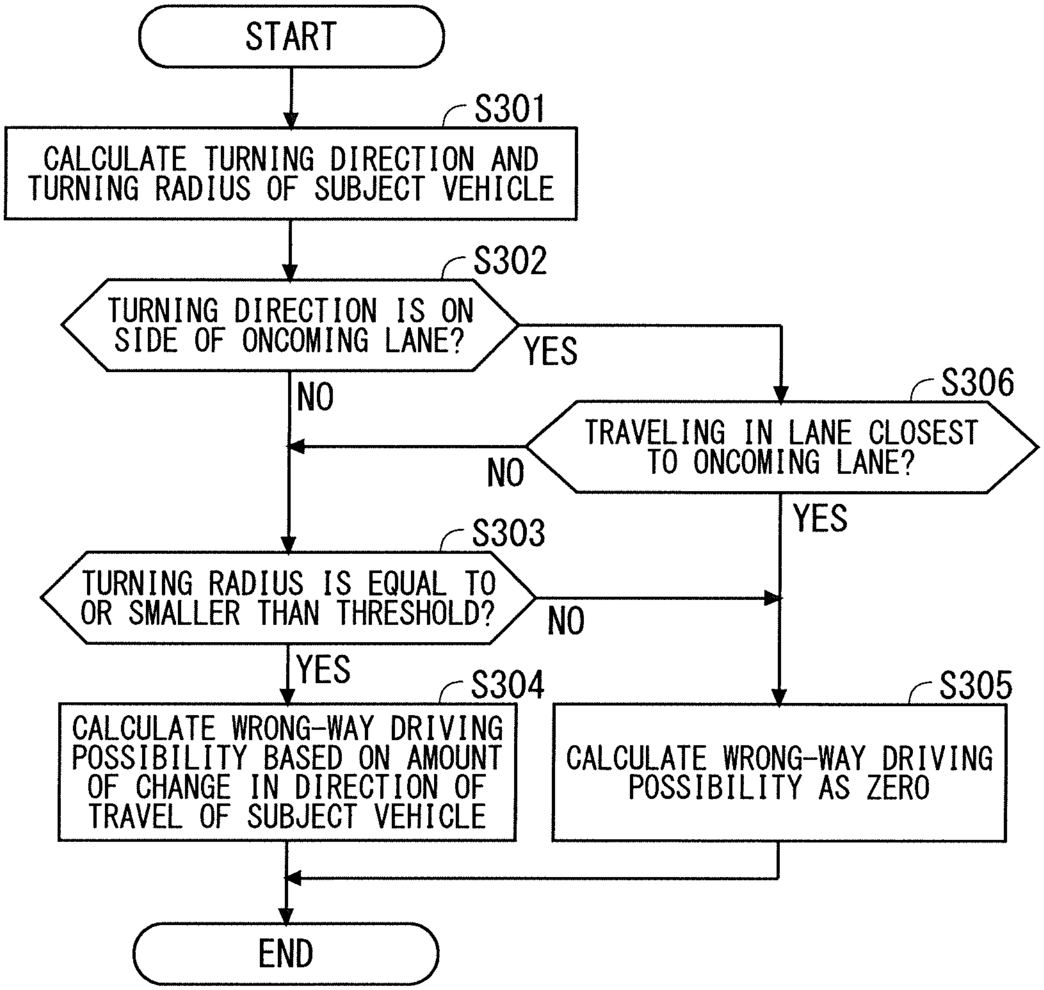
FIG. 7 is a flowchart showing processing of calculating a wrong-way driving possibility in Embodiment 2.

In the wrong-way driving determination apparatus 10 according to Embodiment 2, the wrong-way driving determination unit 13 performs processing shown in FIG. 7 in step S103 of the operational flow shown in FIG. 4.

First, the wrong-way driving determination unit 13 calculates the turning direction and the turning radius of the subject vehicle based on the location and the direction of travel of the subject vehicle included in the travel state information calculated by the travel state information calculation unit 12 (step S301). In this case, when the turning direction of the subject vehicle is a direction on the side opposite the oncoming lane (NO in step S302), and the turning radius of the subject vehicle is equal to or smaller than the predetermined threshold (half the width of the road on which the subject vehicle is traveling) (YES in step S303), the wrong-way driving determination unit 13 determines that there is a possibility of wrong-way driving of the subject vehicle, and calculates the wrong-way driving possibility P2 based on the amount of change in direction of travel of the subject vehicle (step S304).

Even if the turning direction of the subject vehicle is a direction on the side of the oncoming lane (YES in step S302), when the subject vehicle was not traveling in the lane closest to the oncoming lane before turning (NO in step S306), the wrong-way driving determination unit 13 determines that there is a possibility of wrong-way driving of the subject vehicle also in this case, and calculates the wrong-way driving possibility P2 based on the amount of change in direction of travel of the subject vehicle (step S304).

However, when the turning direction of the subject vehicle is the direction on the side of the oncoming lane (YES in step S302), and the subject vehicle was traveling in the lane closest to the oncoming lane before turning (YES in step S306), the wrong-way driving determination unit 13 determines that the subject vehicle has made the normal U-turn, and calculates the wrong-way driving possibility P2 as zero (step S305).

Since the wrong-way driving possibility P2 is calculated based on whether the turning radius of the subject vehicle is equal to or smaller than half the width of the road, reliability of the width of the road can be considered as reliability N2 of the wrong-way driving possibility P2. In the present embodiment, a road edge detection coefficient indicating whether the road information generation unit 11 has detected a road edge is considered as the reliability N2 of the width of the road. Assume that the road edge detection coefficient has a value of 1 when the road information generation unit 11 has detected the road edge of the road on which the subject vehicle is traveling, and has a value of 0.5 when the road information generation unit 11 has not detected the road edge (e.g., when the road shoulder indicating the road edge and the like are not originally present).

According to the wrong-way driving determination apparatus 10 according to Embodiment 2, the wrong-way driving possibility P2 of the subject vehicle is calculated without using satellite positioning and the map information. Whether the subject vehicle is traveling the wrong way can thus be determined with stability and high accuracy with accuracy of calculation of the wrong-way driving possibility P2 not depending on accuracy of satellite positioning and accuracy of the map information.

[Modification 1]

Figure 8:
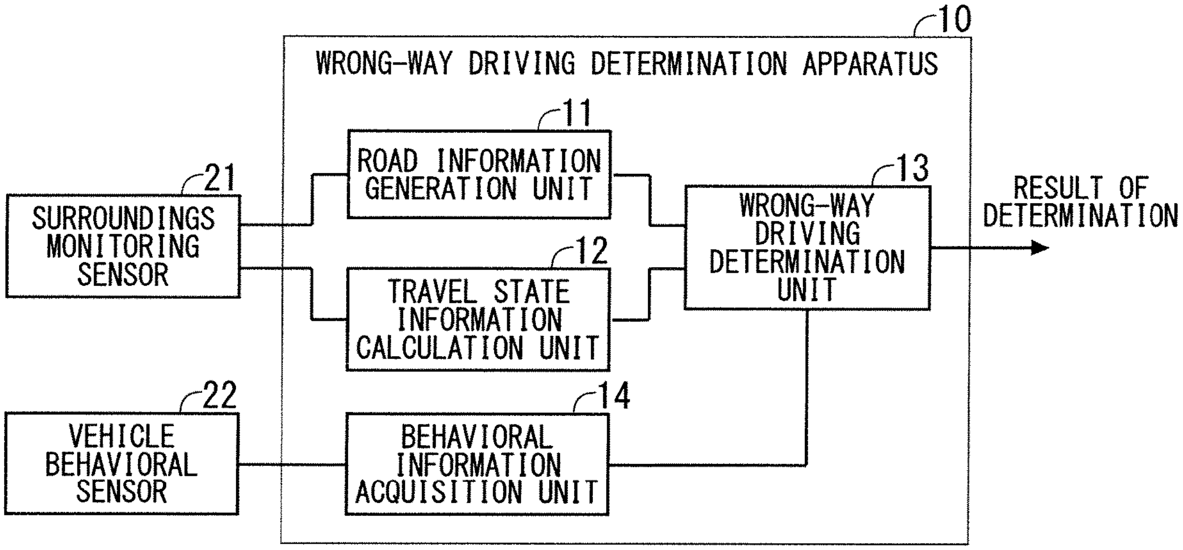
FIG. 8 is a diagram showing a configuration of a wrong-way driving determination apparatus according to a modification of Embodiment 2.

FIG. 8 is a diagram showing a modification of the wrong-way driving determination apparatus 10 according to Embodiment 2. As with the configuration shown in FIG. 6, a configuration shown in FIG. 8 is a configuration obtained by connecting the vehicle behavioral sensor 22 outside the wrong-way driving determination apparatus 10, and providing the behavioral information acquisition unit 14 in the wrong-way driving determination apparatus 10 with respect to the configuration shown in FIG. 1. In contrast to FIG. 6, however, the behavioral information acquired by the vehicle behavioral sensor 22 is provided to the wrong-way driving determination unit 13.

The vehicle behavioral sensor 22 is the sensor to detect the behavior of the subject vehicle, and is the speed sensor, the acceleration sensor, and the orientation sensor, for example. The behavioral information acquisition unit 14 acquires the behavioral information being the information on the behavior of the subject vehicle acquired by the vehicle behavioral sensor 22.

In the present modification, when the turning direction and the turning radius of the subject vehicle cannot be calculated from the travel state information, the wrong-way driving determination unit 13 calculates the turning direction and the turning radius of the subject vehicle from the behavioral information acquired by the behavioral information acquisition unit 14. Similarly, when the amount of change in direction of travel of the subject vehicle cannot be calculated from the travel state information, the wrong-way driving determination unit 13 calculates the amount of change in direction of travel of the subject vehicle from the behavioral information acquired by the behavioral information acquisition unit 14.

Even when the turning direction and the turning radius of the subject vehicle and the amount of change in direction of travel of the subject vehicle can be calculated from the travel state information, the wrong-way driving determination unit 13 may use the behavioral information acquired by the behavioral information acquisition unit 14 to correct these pieces of information.

According to the present modification, even when the turning direction and the turning radius of the subject vehicle cannot be calculated from the travel state information, the wrong-way driving determination unit 13 can calculate them from the behavioral information, so that the wrong-way driving possibility of the subject vehicle can continuously be calculated.

[Modification 2]

Embodiment 1 and Embodiment 2 are combinable. For example, the wrong-way driving determination unit 13 may calculate the wrong-way driving possibility P1 in Embodiment 1 as a first wrong-way driving possibility, calculate the wrong-way driving possibility P2 in Embodiment 2 as a second wrong-way driving possibility, and calculate a weighted average of the first wrong-way driving possibility P1 and the second wrong-way driving possibility P2 as an eventual wrong-way driving possibility Pr1 of the subject vehicle.

Weighting of the first wrong-way driving possibility P1 and the second wrong-way driving possibility P2 in the weighted average is only required to be set based on the reliability N1 of the first wrong-way driving possibility P1 and the reliability N2 of the second wrong-way driving possibility P2. Specifically, the wrong-way driving determination unit 13 is only required to calculate the wrong-way driving possibility Pr1 of the subject vehicle based on the first wrong-way driving possibility P1 and the reliability N1 thereof and the second wrong-way driving possibility P2 and the reliability N2 thereof using the following equation (1):

$$Pr1=P1\times N1/(N1+N2)+P2\times N2/(N1+N2) \tag{1}$$

According to the present modification, higher accuracy of calculation of the wrong-way driving possibility of the vehicle can be maintained.

Embodiment 3

Figure 9:
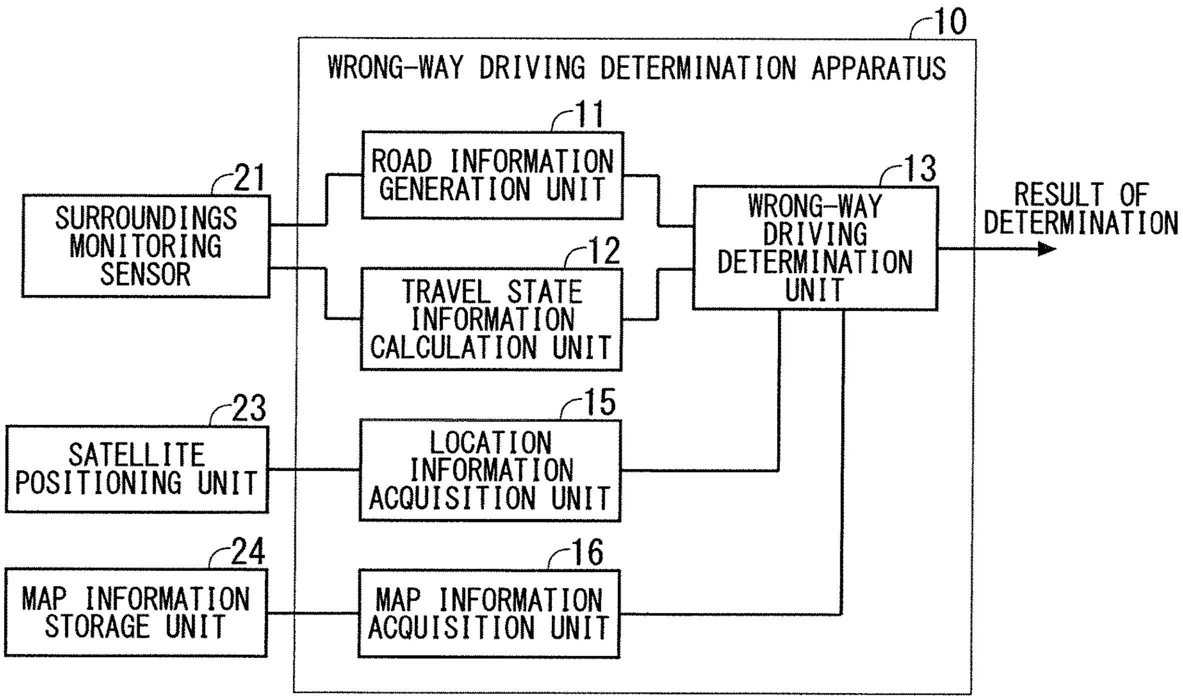
FIG. 9 is a diagram showing a configuration of a wrong-way driving determination apparatus according to Embodiment 3.

FIG. 9 is a diagram showing a configuration of the wrong-way driving determination apparatus 10 according to Embodiment 3. The configuration shown in FIG. 9 is a configuration obtained by connecting a satellite positioning unit 23 and a map information storage unit 24 outside the wrong-way driving determination apparatus 10, and providing a location information acquisition unit 15 and a map information acquisition unit 16 in the wrong-way driving determination apparatus 10 with respect to the configuration shown in FIG. 1.

The satellite positioning unit 23 is a means of measuring the location (absolute location) of the subject vehicle by satellite positioning using the GPS and the like. The map information storage unit 24 is a storage medium in which the map information is stored. The map information stored in the map information storage unit 24 includes information on a location of each lane (or locations of lane markings) and a proper direction of travel of each lane on a road. The map information storage unit 24 may be a server installed outside the subject vehicle and providing the map information to the wrong-way driving determination apparatus 10 by communication.

The location information acquisition unit 15 acquires information on the location of the subject vehicle measured by the satellite positioning unit 23 by satellite positioning and accuracy of satellite positioning. The information on accuracy of satellite positioning is dilution of precision (DOP), for example. The DOP is obtained by indexing a satellite constellation state, and a smaller value of the DOP shows a tendency toward higher positioning accuracy. The map information acquisition unit 16 acquires map information around the location of the subject vehicle from the map information storage unit 24.

In Embodiment 3, the wrong-way driving determination unit 13 calculates the wrong-way driving possibility P1 of the subject vehicle by a similar method to that in Embodiment 1 when accuracy of satellite positioning is equal to or lower than a predetermined threshold (e.g., when the DOP is 3 or more), and calculates a wrong-way driving possibility P3 of the subject vehicle based on the location of the subject vehicle acquired by the location information acquisition unit 15 and the map information acquired by the map information acquisition unit 16 when accuracy of satellite positioning is higher than the threshold (e.g., when the DOP is less than 3). The wrong-way driving determination unit 13 determines whether the subject vehicle is traveling the wrong way based on a value of the calculated wrong-way driving possibility P1 or wrong-way driving possibility P3.

Accuracy of satellite positioning, however, is likely to be unstable due to the effect of the surroundings when the subject vehicle is traveling, so that the wrong-way driving determination unit 13 may calculate the wrong-way driving possibility P3 of the subject vehicle based on the location of the subject vehicle acquired by the location information acquisition unit 15 and the map information acquired by the map information acquisition unit 16 on condition that a state in which accuracy of satellite positioning is higher than the threshold continues for a certain period of time (e.g., 10 seconds) or more.

A method of calculating the wrong-way driving possibility P3 of the subject vehicle based on the location (absolute location) of the subject vehicle acquired by the location information acquisition unit 15 and the map information acquired by the map information acquisition unit 16 may be basically the same as the method of calculating the wrong-way driving possibility P1 in Embodiment 1. That is to say, the wrong-way driving determination unit 13 determines the lane in which the subject vehicle is traveling from the location of each lane included in the map information and the absolute location of the subject vehicle to map the location of the subject vehicle onto the lane represented by the map information. The wrong-way driving determination unit 13 calculates the difference (orientation difference Y) between the proper direction of travel of the lane included in the map information and the direction of travel of the subject vehicle known from a change in location of the subject vehicle, and calculates the wrong-way driving possibility P3 based on the orientation difference Y.

As with the wrong-way driving possibility P1 in Embodiment 1, the wrong-way driving possibility P3 is only required to be calculated as zero when the orientation difference Y is less than 90°, as 0.5 when the orientation difference Y is 90°, to be increased with increasing orientation difference Y when the orientation difference Y is more than 90°, and as 1.0 when the orientation difference Y is 180°.

According to Embodiment 3, the wrong-way driving determination apparatus 10 can calculate the wrong-way driving possibility P3 of the subject vehicle based on the location of the subject vehicle measured by satellite positioning and the map information when accuracy of satellite positioning is high, and calculate the wrong-way driving possibility P1 of the subject vehicle based on the information acquired by the surroundings monitoring sensor 21 when accuracy of satellite positioning is low, so that high accuracy of determination of the wrong-way driving possibility can be maintained. It is obvious that Embodiment 3 is applicable to Modification 1 of Embodiment 1.

[Modification 1]

Embodiment 3 is also applicable to Embodiment 2. That is to say, the wrong-way driving determination unit 13 may calculate the wrong-way driving possibility P2 of the subject vehicle by a similar method to that in Embodiment 2 when accuracy of satellite positioning is equal to or lower than the predetermined threshold, and calculate the direction of travel and the turning radius of the subject vehicle from the change in location of the subject vehicle acquired by the location information acquisition unit 15 and calculate a wrong-way driving possibility P4 based on the lane in which the subject vehicle was traveling before turning, the turning radius of the subject vehicle, and the amount of change in direction of travel of the subject vehicle when accuracy of satellite positioning is higher than the threshold.

In this case, a method of calculating the wrong-way driving possibility P4 may be similar to the method of calculating the wrong-way driving possibility P2 in Embodiment 2. That is to say, the wrong-way driving possibility P4 is defined as the ratio of the amount of change in direction of travel of the subject vehicle to the certain angle θ (e.g., fixed value from 120° to 180°).

It is obvious that Embodiment 3 is applicable to Modification 1 of Embodiment 2.

[Modification 2]

Embodiment 3 is also applicable to the combination of Embodiment 1 and Embodiment 2 (Modification 2 of Embodiment 2). That is to say, the wrong-way driving determination unit 13 may calculate the wrong-way driving possibility Pr1 using the above-mentioned equation (1) when accuracy of satellite positioning is equal to or lower than the predetermined threshold, and calculate the above-mentioned wrong-way driving possibility P3 as the first wrong-way driving possibility, calculate the above-mentioned wrong-way driving possibility P4 as the second wrong-way driving possibility, and calculate a weighted average of the first wrong-way driving possibility P3 and the second wrong-way driving possibility P4 as an eventual wrong-way driving possibility Pr2 of the subject vehicle when accuracy of satellite positioning is higher than the threshold.

Weighting of the first wrong-way driving possibility P3 and the second wrong-way driving possibility P4 in the weighted average is only required to be set based on reliability N3 of the first wrong-way driving possibility P3 and reliability N4 of the second wrong-way driving possibility P4. Specifically, the wrong-way driving determination unit 13 is only required to calculate the wrong-way driving possibility Pr2 of the subject vehicle based on the first wrong-way driving possibility P3 and the reliability N3 thereof and the second wrong-way driving possibility P4 and the reliability N4 thereof using the following equation (2):

$$Pr2 = P3 \times N3/(N3+N4) + P4 \times N4/(N3+N4) \quad (2)$$

Information on the proper direction of travel of each lane and the width of the road can be acquired from the map information, so that the reliability N3 corresponding to the reliability of the proper direction of travel of the lane in which the subject vehicle is traveling and the reliability N4 corresponding to the reliability of the width of the road are each only required to be 1.

According to the present modification, higher accuracy of calculation of the wrong-way driving possibility of the vehicle can be maintained.

Examples of Hardware Configuration

Figure 10:
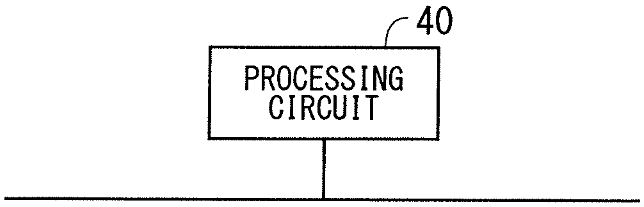
FIG. 10 is a diagram showing an example of a hardware configuration of the wrong-way driving determination apparatus.
Figure 11:
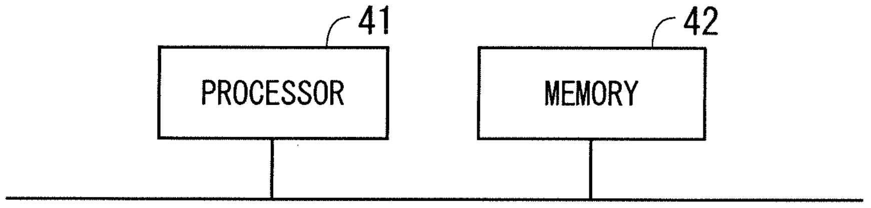
FIG. 11 is a diagram showing an example of the hardware configuration of the wrong-way driving determination apparatus.

FIGS. 10 and 11 show examples of a hardware configuration of the wrong-way driving determination apparatus 10. Functions of the components of the wrong-way driving determination apparatus 10 shown in FIG. 1 are achieved by a processing circuit 40 shown in FIG. 10, for example. That is to say, the wrong-way driving determination apparatus 10 includes the processing circuit 40 that generates the road information including the information on the location and the proper direction of travel of each lane of the road on which the subject vehicle is traveling based on the surroundings information acquired by the surroundings monitoring sensor of the subject vehicle, calculates the travel state information including the information on the location and the direction of travel of the subject vehicle on the road on which the subject vehicle is traveling based on the surroundings information, and calculates the wrong-way driving possibility of the subject vehicle based on the road information and the travel state information and determines whether the subject vehicle is traveling the wrong way based on the value of the wrong-way driving possibility. The processing circuit 40 may be dedicated hardware, or may be configured using a processor (also referred to as a central processing unit (CPU), a processing unit, an arithmetic unit, a microprocessor, a microcomputer, and a digital signal processor (DSP)) that executes a program stored in memory.

When the processing circuit 40 is the dedicated hardware, the processing circuit 40 corresponds to a single circuit, a composite circuit, a programmed processor, a parallel programmed processor, an application specific integrated circuit (ASIC), a field-programmable gate array (FPGA), and a combination thereof, for example. The functions of the components of the wrong-way driving determination apparatus 10 may be achieved by discrete processing circuits, or may collectively be achieved by a single processing circuit.

FIG. 11 shows an example of the hardware configuration of the wrong-way driving determination apparatus 10 when the processing circuit 40 is configured using a processor 41 that executes a program. In this case, the functions of the components of the wrong-way driving determination apparatus 10 are achieved by software and the like (software, firmware, or a combination of software and firmware). The software and the like are described as a program, and stored in memory 42. The processor 41 reads and executes the program stored in the memory 42 to achieve the functions of the respective units. That is to say, the wrong-way driving determination apparatus 10 includes the memory 42 to store a program which, when executed by the processor 41, results in performance of processing of generating the road information including the information on the location and the proper direction of travel of each lane of the road on which the subject vehicle is traveling based on the surroundings information acquired by the surroundings monitoring sensor of the subject vehicle, processing of calculating the travel state information including the information on the location and the direction of travel of the subject vehicle on the road on which the subject vehicle is traveling based on the surroundings information, and processing of calculating the wrong-way driving possibility of the subject vehicle based on the road information and the travel state information, and determining whether the subject vehicle is traveling the wrong way based on the value of the wrong-way driving possibility. In other words, the program causes a computer to execute procedures or methods of operation of the components of the wrong-way driving determination apparatus 10.

The memory 42 herein may be, for example, nonvolatile or volatile semiconductor memory, such as random access memory (RAM), read only memory (ROM), flash memory, erasable programmable read only memory (EPROM), and electrically erasable programmable read only memory (EEPROM), a hard disk drive (HDD), a magnetic disk, a flexible disk, an optical disc, a compact disc, a mini disc, a digital versatile disc (DVD), a drive device thereof, and the like or any storage medium to be used in the future.

A configuration in which the functions of the components of the wrong-way driving determination apparatus 10 are achieved either by the hardware or by the software and the like is described above. A configuration, however, is not limited to this configuration, and some of the components of the wrong-way driving determination apparatus 10 may be achieved by the dedicated hardware, and the other components may be achieved by the software and the like. For example, functions of some of the components can be achieved by the processing circuit 40 as the dedicated hardware, and functions of the other components can be achieved by the processing circuit 40 as the processor 41 reading and executing the program stored in the memory 42.

As described above, the wrong-way driving determination apparatus 10 can achieve the above-mentioned functions by hardware, software and the like, or a combination thereof.

Embodiments can freely be combined with each other, and can be modified or omitted as appropriate.

The foregoing description is in all aspects illustrative, and it is understood that numerous unillustrated modifications can be devised.

EXPLANATION OF REFERENCE SIGNS

10 wrong-way driving determination apparatus, 11 road information generation unit, 12 travel state information calculation unit, 13 wrong-way driving determination unit, 14 behavioral information acquisition unit, 15 location information acquisition unit, 16 map information acquisition unit, 21 surroundings monitoring sensor, 22 vehicle behavioral sensor, 23 satellite positioning unit, 24 map information storage unit, 40 processing circuit, 41 processor, 42 memory.

The invention claimed is:

1. A wrong-way driving determination apparatus comprising:

a GPS-based satellite positioning system disposed inside a subject vehicle including a receiver to receive GPS signals providing information of a location of the subject vehicle and a storage device to store map information including information on a proper direction of travel of each lane on a road;

a surroundings monitoring sensor system comprising at least one of a camera mounted on an exterior of a subject vehicle with a field of view configured to capture a road surface, vehicles, and obstacles in front of the subject vehicle, a light detection and ranging (LiDAR) sensor mounted on the exterior of the subject vehicle to irradiate laser to and receive reflected signals from vehicles and obstacles in front of the subject vehicle;

a user interface operably disposed inside the subject vehicle including at least one of a display and a speaker;

a processor operably disposed inside the subject vehicle to execute a program; and a memory operably disposed inside the subject vehicle to store the program which, when executed by the processor, performs processes of:

determining an accuracy of satellite positioning by the GPS-based satellite positioning system, in response to the determined accuracy of satellite positioning being above a predetermined threshold, calculating a wrong-way driving possibility of the subject vehicle by comparing the information of the location of the subject vehicle indicated by the GPS signals to the stored map information, and determining whether the subject vehicle is traveling the wrong way based on a value of the wrong-way driving possibility, and in response to the determined accuracy of satellite positioning being below the predetermined threshold, generating, based on surroundings information acquired by the surroundings monitoring sensor system, road information including information on a location and a proper direction of travel of each lane of a road on which the subject vehicle is traveling;

calculating, based on the surroundings information, travel state information including information on a location and a direction of travel of the subject vehicle on the road on which the subject vehicle is traveling; and calculating a wrong-way driving possibility of the subject vehicle based on the road information and the travel state information, and determining whether the subject vehicle is traveling the wrong way based on a value of the wrong-way driving possibility; and in response to determining that the subject vehicle is traveling the wrong way, controlling the user interface to generate a visual and/or audio output to inform a driver of the subject vehicle that the subject vehicle is traveling the wrong way.

2. The wrong-way driving determination apparatus according to claim 1, wherein the processor calculates the wrong-way driving possibility based on a difference between a proper direction of travel of a lane in which the subject vehicle is traveling and the direction of travel of the subject vehicle.

3. The wrong-way driving determination apparatus according to claim 1, wherein when the location and the direction of travel of the subject vehicle cannot be calculated from the surroundings information, the processor calculates the location and the direction of travel of the subject vehicle from behavioral information being information acquired by a vehicle behavioral sensor of the subject vehicle.

4. The wrong-way driving determination apparatus according to claim 1, wherein the processor calculates a turning direction and a turning radius of the subject vehicle from the travel state information, and calculates the wrong-way driving possibility based on a lane in which the subject vehicle was traveling before turning, the turning direction and the turning radius of the subject vehicle, and the amount of change in direction of travel of the subject vehicle.

5. The wrong-way driving determination apparatus according to claim 4, wherein when the turning direction and the turning radius of the subject vehicle cannot be calculated from the travel state information, the processor calculates the turning direction and the turning radius of the subject vehicle from behavioral information being information acquired by a vehicle behavioral sensor of the subject vehicle.

6. The wrong-way driving determination apparatus according to claim 4, wherein when the amount of change in direction of travel of the subject vehicle cannot be calculated from the travel state information, the processor calculates the amount of change in direction of travel of the subject vehicle from behavioral information being information acquired by a vehicle behavioral sensor of the subject vehicle.

7. The wrong-way driving determination apparatus according to claim 1, wherein the processor calculates a first wrong-way driving possibility based on a difference between a proper direction of travel of a lane in which the subject vehicle is traveling and the direction of travel of the subject vehicle, calculates a turning direction and a turning radius of the subject vehicle from the travel state information, calculates a second wrong-way driving possibility based on a lane in which the subject vehicle was traveling before turning, the turning direction and the turning radius of the subject vehicle, and the amount of change in direction of travel of the subject vehicle, and calculates a weighted average of the first wrong-way driving possibility and the second wrong-way driving possibility as the wrong-way driving possibility.

8. The wrong-way driving determination apparatus according to claim 7, wherein weighting of the first wrong-way driving possibility and the second wrong-way driving possibility in the weighted average is set based on reliability of the first wrong-way driving possibility and reliability of the second wrong-way driving possibility.

9. The wrong-way driving determination apparatus according to claim 7, wherein when the turning direction and the turning radius of the subject vehicle cannot be calculated from the travel state information, the processor calculates the turning direction and the turning radius of the subject vehicle from behavioral information being information acquired by a vehicle behavioral sensor of the subject vehicle.

10. The wrong-way driving determination apparatus according to claim 7, wherein when the amount of change in direction of travel of the subject vehicle cannot be calculated from the travel state information, the processor calculates the amount of change in direction of travel of the subject vehicle from behavioral information being information acquired by a vehicle behavioral sensor of the subject vehicle.

11. The wrong-way driving determination apparatus according to claim 1, wherein the processor determines that the subject vehicle is traveling the wrong way when the wrong-way driving possibility exceeds another predetermined threshold.

12. The wrong-way driving determination apparatus according to claim 1, wherein the road information further includes information on a width and a location of a centerline of each lane.

13. A wrong-way driving determination method comprising:

receiving, via a receiver of a GPS-based satellite positioning system disposed inside a subject vehicle, GPS signals providing information of a location of the subject vehicle, and acquiring map information from a storage device of the GPS-based satellite positioning system, said map information including information on a proper direction of travel of each lane on a road;

acquiring surroundings information via a surroundings monitoring sensor system comprising at least one of a camera mounted on an exterior of a subject vehicle with a field of view configured to capture a road surface, vehicles, and obstacles in front of the subject vehicle, and a light detection and ranging (LiDAR) sensor mounted on the exterior of the subject vehicle to irradiate laser to and receive reflected signals from vehicles and obstacles in front of the subject vehicle;

determining, by a processor operably disposed in the subject vehicle, an accuracy of satellite positioning by the GPS-based satellite positioning system, in response to the determined accuracy of satellite positioning being above a predetermined threshold, calculating by the processor a wrong-way driving possibility of the subject vehicle by comparing the information of the location of the subject vehicle indicated by the GPS signals to the stored map information, and determining whether the subject vehicle is traveling the wrong way based on a value of the wrong-way driving possibility; and in response to the determined accuracy of satellite positioning being below the predetermined threshold, generating, by the processor, road information including information on a location and a proper direction of travel of each lane of a road on which a subject vehicle is traveling based on surroundings information acquired by the surroundings monitoring sensor system, calculating, by the processor, travel state information including information on a location and a direction of travel of the subject vehicle on the road on which the subject vehicle is traveling based on the surroundings information, and calculating a wrong-way driving possibility of the subject vehicle based on the road information and the travel state information, and determining whether the subject vehicle is traveling the wrong way based on a value of the wrong-way driving possibility; and in response to determining that the subject vehicle is traveling the wrong way, controlling a user interface, which is operably disposed inside the subject vehicle and includes at least one of a speaker and a display, to generate a visual and/or audio output to inform a driver of the subject vehicle that the subject vehicle is traveling the wrong way.

* * * * *